Oct. 6, 1953  H. H. WISTER ET AL  2,654,621
FAUCET BIBB REPAIR HANDLE
Filed Oct. 9, 1950

H. H. Wister
J. W. Wister
C. B. Davis
INVENTORS

BY *C. A. Snow & Co.*
ATTORNEYS

UNITED STATES PATENT OFFICE 2,654,621

FAUCET BIBB REPAIR HANDLE

Harry H. Wister, John W. Wister, and
Charles B. Davis, Wilmington, Calif.

Application October 9, 1950, Serial No. 189,176

1 Claim. (Cl. 287—53)

This invention relates to a repair handle for use in connection with bibbs or faucets, the primary object of the invention being to provide a handle which may be readily and easily positioned over the handle end of the bibb stem of a faucet, means being provided for firmly securing the handle in position, against accidental displacement.

An important object of the invention is to provide a device of this character which includes a head having an opening so that it may be fitted over the bibb or faucet stem, the wall of the opening having teeth that mesh with teeth of the bibb stem, together with means for securing the head in position against movement with respect to the bibb stem.

Still another object of the invention is to provide a repair handle for use in connection with bibb stems of faucets, wherein the handle may be secured against rotation with respect to the bibb stem on which it is positioned.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1:
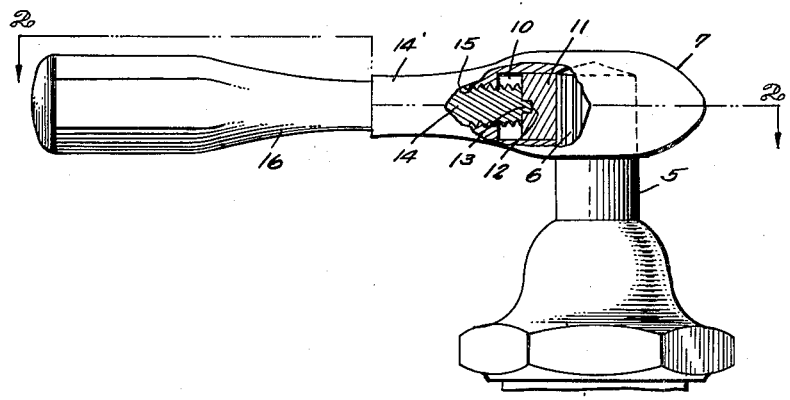
Figure 1 is a side elevational view, illustrating a handle constructed in accordance with the invention as positioned on the stem of a faucet.

Referring to the drawing in detail, the reference character 5 indicates the bibb stem of a faucet, which is provided with the usual teeth 6 which are elongated and extend longitudinally of the stem 5. The reference character 7 indicates the head of the repair handle, forming the subject matter of the present invention, the head being provided with an opening with the end wall of the opening curved at 8, the wall of the opening of the head being formed with vertical teeth 9 that are adapted to mesh with the teeth 6 of the bibb stem, so that rotary movement of the head with respect to the bibb stem, will be prevented.

The opening in the head 7 is elongated and is formed with parallel walls 10 between which the jaw 11 of the repair handle moves, the jaw 11 being provided with a curved inner edge formed with teeth that mesh with the teeth 6 of the bibb stem. The jaw 11 is formed with an opening 12 in which the extension 13, formed on the inner end of the handle proper 14, is disposed for rotation.

Figure 2:
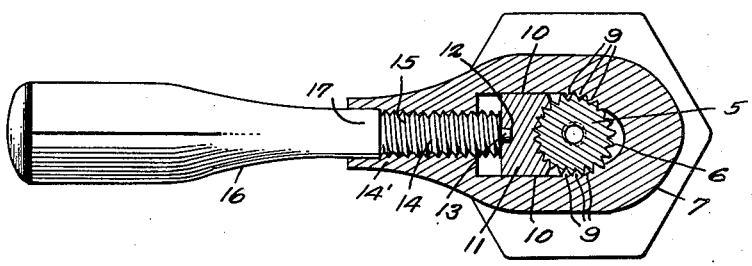
Fig. 2 is a sectional view taken on line 2—2 of Fig. 1.

The head 7 is provided with an extension 14', which is internally threaded, to accommodate the threads 15 formed on one end of the handle 16. As shown by Fig. 2 of the drawing, the opening of the extension 14' is enlarged at its outer end to accommodate the enlarged portion 17 of the handle to protect the threads of the handle against foreign matter entering the extension 14'.

When the usual handle of the faucet becomes worn to such a degree that it will not operate to rotate the valve, the valve handle is removed and a repair handle such as constituting the subject matter of the present invention, is positioned over the bibb stem, with the teeth of the head meshing with the teeth of the bibb stem. The handle 16 is now operated to force the movable jaw 11 into contact with the teeth of the bibb stem, securely fastening the handle on the bibb stem.

Having thus described the invention, what is claimed is:

A movable handle for attachment to a faucet stem, comprising a head having an opening formed with a rounded end fitted over such faucet stem, cooperating teeth on the rounded end of the opening of the head and stem, connecting the head and stem, a jaw movable in said opening, said jaw having a curved surface formed with teeth adapted to engage the teeth of the stem holding the head in clamped relation with the stem, said jaw having an opening, a movable handle section threaded in an opening of the head, said handle section having a reduced end formed with a straight outer edge, rotatably fitted in the opening of the jaw and said handle section adapted to operate to move said jaw into clamping relation with the stem.

HARRY H. WISTER.
JOHN W. WISTER.
CHARLES B. DAVIS.

References Cited in the file of this patent

UNITED STATES PATENTS

| Number    | Name        | Date          |
|-----------|-------------|---------------|
| 1,543,145 | Yeomans     | June 23, 1925 |
| 2,300,406 | Curtis      | Nov. 3, 1942  |
| 2,469,705 | Vesper      | May 10, 1949  |
| 2,535,382 | Bachli et al. | Dec. 26, 1950 |